United States Patent [19]

Miyaoka et al.

[11] Patent Number: 4,831,659
[45] Date of Patent: May 16, 1989

[54] METHOD FOR IMAGE DATA CODING

[75] Inventors: Shinichiro Miyaoka, Kawasaki; Ryoichi Sasaki, Fujisawa; Takayoshi Shiraishi, Chigasaki, all of Japan

[73] Assignee: Hitachi, Ltd., Tokyo, Japan

[21] Appl. No.: 208,851

[22] Filed: Jun. 7, 1988

Related U.S. Application Data

[63] Continuation of Ser. No. 923,854, Oct. 28, 1986, abandoned.

[30] Foreign Application Priority Data

Oct. 28, 1985 [JP] Japan ................................ 60-241218

[51] Int. Cl.4 .............................................. G06K 9/00
[52] U.S. Cl. ...................................... 382/56; 358/260
[58] Field of Search .................... 382/56, 27; 358/260, 358/263

[56] References Cited

U.S. PATENT DOCUMENTS

| 4,205,341 | 5/1980 | Mitsuya | 358/260 |
| 4,222,076 | 9/1980 | Knowlton | 358/260 |
| 4,231,095 | 10/1980 | Cassagne | 358/260 |
| 4,261,018 | 4/1981 | Knowlton | 358/260 |
| 4,319,267 | 3/1982 | Mitsuya | 358/260 |
| 4,520,506 | 5/1985 | Chan | 382/56 |
| 4,691,329 | 9/1987 | Juri | 382/56 |

Primary Examiner—Leo H. Boudreau
Attorney, Agent, or Firm—Antonelli, Terry & Wands

[57] ABSTRACT

To efficiently compress image data, the image data is divided into rectangular blocks of non-equal length in a hierarchal structure in accordance with a brightness change, and is encoded into tree-structure data for each of the divided blocks so that the mean distortion of the image data inside each block does not exceed an allowable value.

3 Claims, 12 Drawing Sheets

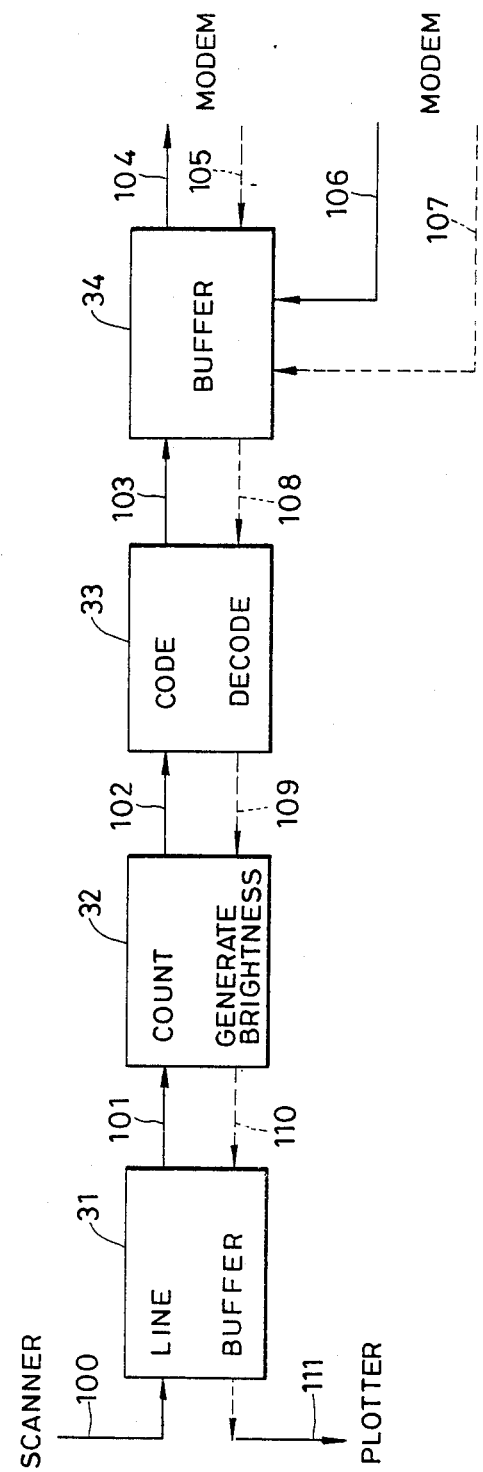

FIG. 10(a)

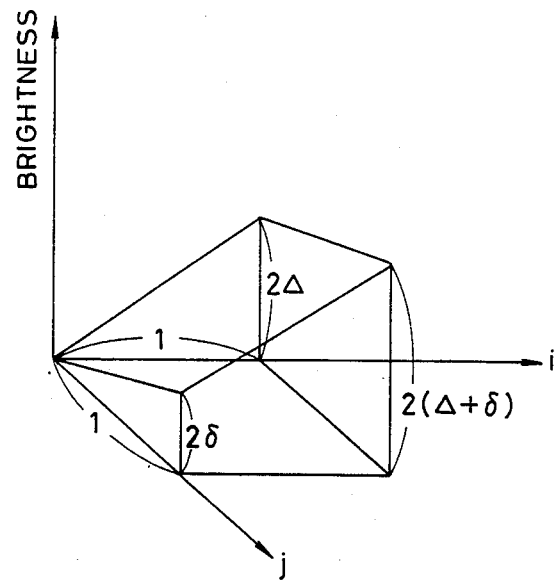

FIG. 10(b)

| $\bar{x}$ $-3\Delta-3\delta$ | $\bar{x}$ $-\Delta-3\delta$ | $\bar{x}$ $+\Delta-3\delta$ | $\bar{x}$ $+3\Delta-3\delta$ |
|---|---|---|---|
| $\bar{x}$ $-3\Delta-\delta$ | $\bar{x}$ $-\Delta-\delta$ | $\bar{x}$ $+\Delta-\delta$ | $\bar{x}$ $+3\Delta-\delta$ |
| $\bar{x}$ $-3\Delta+\delta$ | $\bar{x}$ $-\Delta+\delta$ | $\bar{x}$ $+\Delta+\delta$ | $\bar{x}$ $+3\Delta+\delta$ |
| $\bar{x}$ $-3\Delta+3\delta$ | $\bar{x}$ $-\Delta+3\delta$ | $\bar{x}$ $+\Delta+3\delta$ | $\bar{x}$ $+3\Delta+3\delta$ |

METHOD FOR IMAGE DATA CODING

This application is a continuation of application Ser. No. 923,854, filed Oct. 28, 1986, now abandoned.

BACKGROUND OF THE INVENTION

This invention relates generally to a method of encoding image data. More particularly, the present invention relates to a method for high efficient data compression of image data which is suitable for image communication, rough image formation of image file retrieval, and the like, at a low bit rate.

Data compression systems for compression of image data with a higher efficiency have been desired in order to reduce the cost of image communication and image data and storage to attain a higher response. Conventional image data compression methods can be classified broadly into a predictive coding method and a transform coding method. The former predicts the brightness value of a given pixel from pixels adjacent thereto in a pixel unit and encodes it in a variable length. However, this method cannot provide compression of less than 1 bit/pixel, in principle. On the other hand, the transform coding method divides an image into sub-blocks having a predetermined size (such as 8×8 and 16×16), and effects orthogonal transform for this block unit and encoding. However, this method is not free from the problem of a limited compression ratio, either, because redundancy in a greater zone exceeding the block size (as typified by a flat background) cannot be utilized.

Besides the two methods described above, a vector quantization method has been investigated intensively in recent years. This method, too, divides an image into sub-blocks of a predetermined size and performs quantization for each block. For this reason, this method is not devoid of the same problem as that of the transform coding method described above. These compression methods are discussed in "Comparison Of Still Picture Coding Methods", published in Communication Society Technical Paper IE83-106, for example. This reference describes comparative studies on the five kinds of methods, i.e., an adaptive casine transform coding, hierarchal Hadamard transform coding, vector quantitization, DPCM coding and adaptive block coding by obtaining the respective S/N ratios, coding quantities and variable data by simulation using a computer. All of these methods involve the problem of the limited compression ratio described above.

SUMMARY OF THE INVENTION

It is an object of the present invention to provide a highly efficient image data encoding method which can eliminate the problem of the prior art methods and can drastically compress image data by utilizing not only local redundancy of an image but also its global redundancy.

To accomplish the object described above, the first characterizing feature of the present invention lies in provision of a buffer for storing data having a hierachy structure, and calls for dividing an image into rectangular blocks having non-equal length in accordance with the degree of brightness change, encoding the divided image into data formed in a tree structure so that mean distortion in each block does not exceed an allowable value and then storing the result in the buffer.

The second characterizing feature of the present invention calls for encoding of the block by use of mean brightness and brightness slope in that block.

BRIEF DESCRIPTION OF THE DRAWINGS

FIG. 2 is a block diagram of an encoding/decoding apparatus showing the embodiment of the present invention;

FIG. 10($a$) and ($b$), is an explanatory view of the slope of brightness and an approximation method of brightness;

DESCRIPTION OF THE PREFERRED EMBODIMENTS

Hereinafter, the principle and some preferred embodiments of the present invention will be described in detail with reference to the accompanying drawings. First of all, the principle of encoding will be explained with reference to FIGS. 3~6 and FIG. 1, and the principle of decoding, with reference to FIGS. 7~9.

Figure 3A:
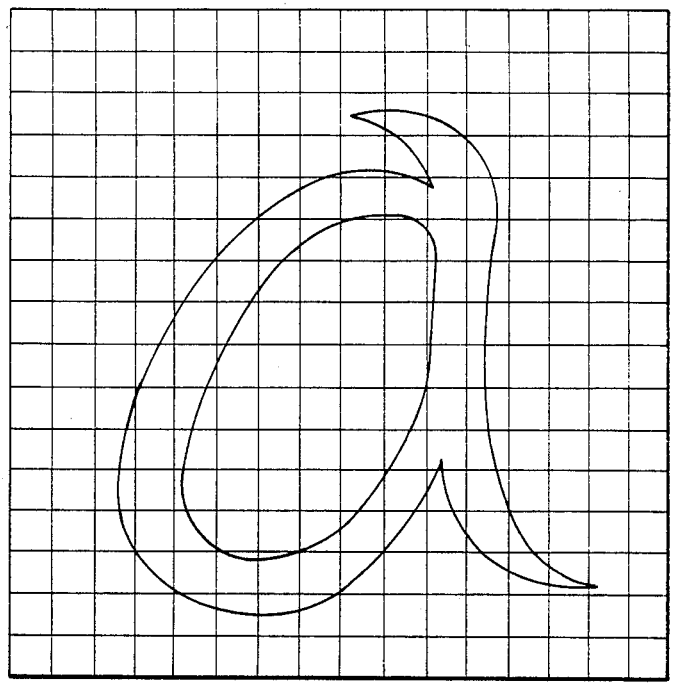
FIG. 3($a$) and ($b$), is a comparative view of the concept of equal length block encoding and the concept of non-equal length block encoding.
Figure 3B:
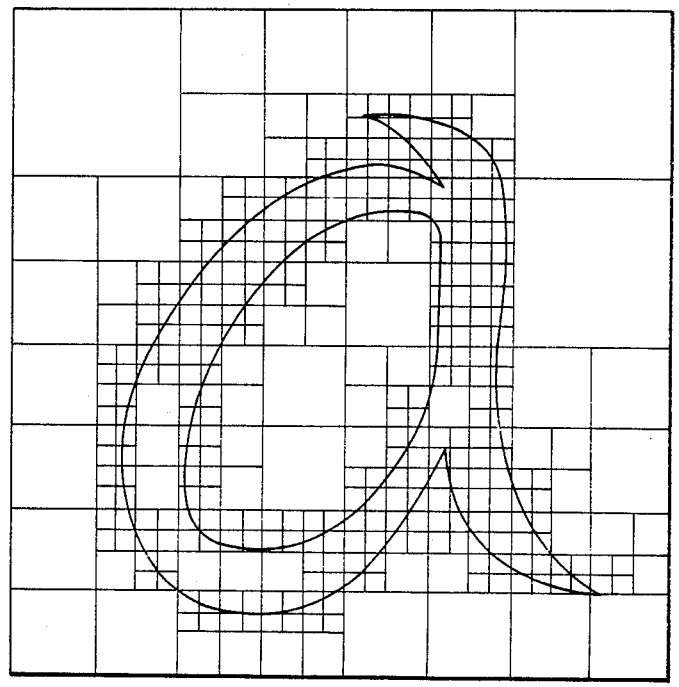

(A) Encoding Method:

FIGS. 3($a$) and 3($b$) are comparative views useful for comparing the concept of equal length block encoding with that of non-equal length block encoding.

In order to effect data compression by utilizing a global redundancy of an image, the image is divided into non-equal length blocks (having different sizes) in accordance with the amount of change in brightness. In other words, the image is divided in such a fashion that its portions having a gradual change in brightness are turned into large blocks while those having a sudden change in brightness are turned into small blocks. If block division is made in this manner and each block is encoded by the same bit number, encoding can be made by utilizing global redundancy which cannot be utilized by equal length block encoding (see FIG. 3($b$).

Mean distortion is used as the reference of block division, so that the mean distortion of each block after encoding and decoding does not exceed a designated allowance value. A mean square error, for example, is mostly used as an index of distortion and is expressed by the following equation:

$$d = \frac{1}{N} \sum_{ij} (\bar{X}_{ij} - X_{ij})^2$$

Where
 d: mean distortion
 N: number of pixels in each block
 $X_{ij}$: brightness of pixel (I, j)
 $\bar{X}_{ij}$: encoded/decoded value of pixel (i, j).

Figure 4:
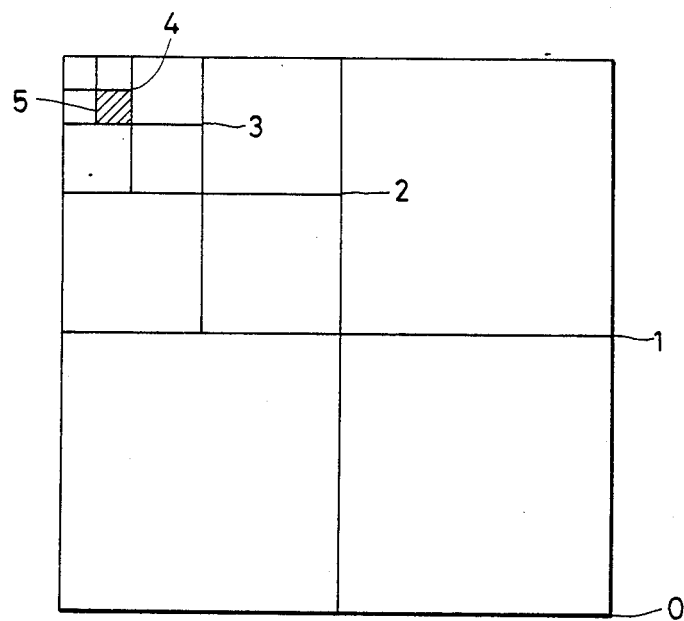
FIG. 4 is an explanatory view of a block hierarchy.
Figure 5:
FIG. 5 is an explanatory view of reduction.

FIG. 4 is an explanatory view of block hierarchy and FIG. 5 is an explanatory view of reduction in FIG. 4.

Let's consider blocks having sizes of $1\times 1, 2\times 2, \ldots, 2^n \times 2^n$. The block $2^n \times 2^n$ represents an image as a whole. Here, the $2^n \times 2^n$ block is called "the uppermost order level (0 level)" and the $1 \times 1$ block, "the lowermost order level (n level)". In the example shown in FIG. 4 (n=4), 0~4 are the 0 to 4th level blocks, respectively. The following expression method will be used to represent each block. Since four blocks each having a size of $2^{n-1} \times 2^{n-1}$ (8×8 pixels) exist in the first level, they are called 1, 2, 3 and 4 in the order of upper left, upper right, lower left and lower right. In the second level, 16 blocks each having a size of $2^{n-2} \times 2^{n-2}$ (4×4 pixels) exist, and four of these blocks correspond to one block of the first level. Therefore, the four blocks of the second level contained in the same block of the first level are called 1, 2, 3 and 4, respectively. In other words, the block of the second level can be determined uniquely by the combination of the block number $i_1$ ($i_1$=1~4) of the first level and the block number $i_2$ ($i_2$=1~4) of the second level. In this manner, one block in the kth level can be expressed generally by ($i_1, i_2, \ldots, i_k$). In the example shown in Fig. 4, the block 5 (the hatched block) can be expressed as (1, 1, 1, 4).

The mean distortion that occurs when the mean brightness of the blocks ($i_1, i_2, \ldots, i_k$) expressed by the expression method described above as $X_{i1}, X_{i2}, \ldots, X_{ik}$ and the brightness of all the pixels in the block is represented by $Xi_1 i_2 \ldots i_k$, is expressed as $di_1 i_2 \ldots i_k$. In other words, the mean distortion is given as follows:

$$Xi_1 \ldots ik = \frac{1}{4^{n-k}} \sum_{ik+1 \ldots in} Zi_1 \ldots i_n \quad (1)$$

$$di_1 \ldots ik = \frac{1}{4^{n-k}} \sum_{ik+1 \ldots in} (Zi_1 \ldots i_n - Xi_1 \ldots ik)^2 \quad (2)$$

where $Zi_1 \ldots i_n$ is the brightness of the pixels ($i_1, i_2 \ldots, i_n$).

When starting from the lowermost order level and the mean distortion defined by equation (2) does not exceed a given allowance value D, the four blocks are combined into one block of an order which is higher by one stage.

When $di_1 \ldots ik \leq D$ (3)

$Xi_1, \ldots i_{k1} \sim Xi_1, \ldots i_{k4}$ are represented by $Xi_1 \ldots i_k$ (see FIG. 5). This procedure will be hereinafter called "reduction". Here, since $Xi_1 \ldots i_k$, $di_1 \ldots i_k$ can be calculated from the level which is lower by one stage in accordance with the following recurrence formula, practically efficient calculation can be made:

$$Xi_1 \ldots ik = \frac{1}{4} \sum_{ik+1} Xi_1 \ldots ik+1 \quad (4)$$

$$di_1 \ldots ik = \frac{1}{4} \sum_{ik+1} [di_1 \ldots ik+1 + (Xi_1 \ldots ik+1 - Xi_1 \ldots ik)^2] \quad (5)$$

Figure 1:
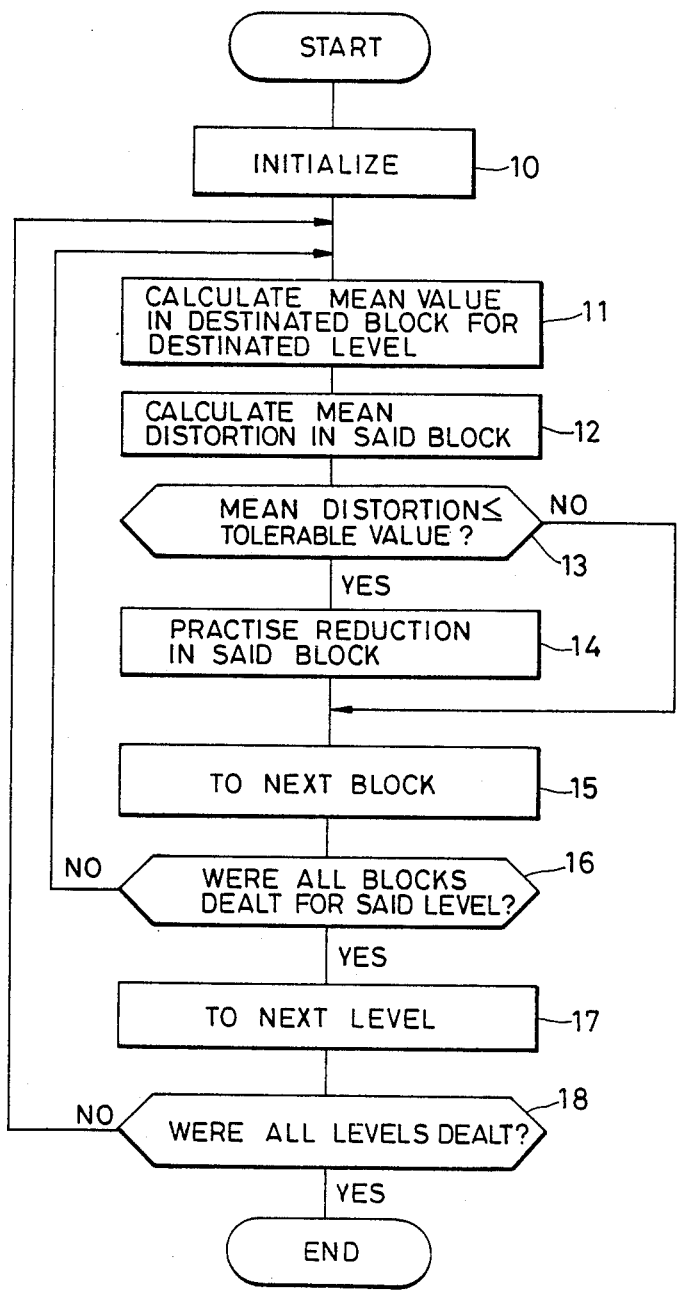
FIG. 1 is a flowchart showing the encoding sequence in one embodiment of the present invention.

FIG. 1 is a flowchart showing the encoding sequence in one embodiment of the present invention.

The encoding sequence based on the concept of FIGS. 3 and 4 will be explained with reference to the flowchart of FIG. 1. The lowermost level top block is set at step 10. The calculation of the formulas (4) and (5) is made at steps 11 and 12 to obtain mean brightness and mean distortion, respectively. Judgement of formula (3) is made at step 13 and when the mean distortion is smaller than the allowance value, that is, when the formula (3) is satisfied, reduction is executed at step 14. Processing of the next block is made at step 15, but when reduction of the next block has already become impossible, this processing is skipped. Whether or not processing of all the blocks of the level which is being processed is completed is judged at step 16 and if it is, processing of the next level is made at step 17. Whether or not processing of all the levels is completed is judged at step 18, and if it is, the encoding processing is complete.

Figure 6A:
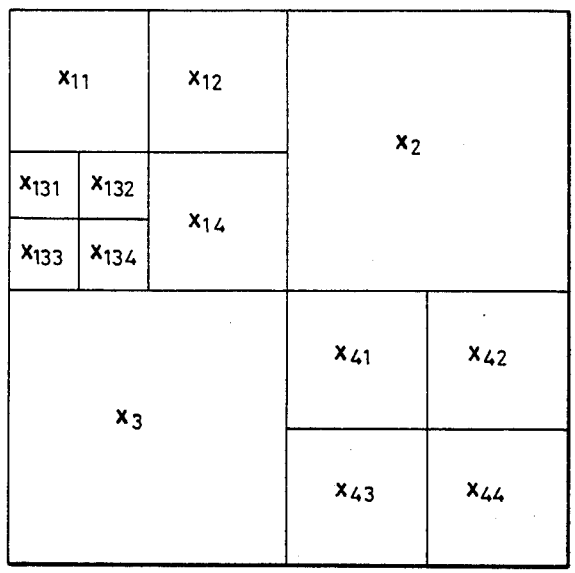
FIG. 6($a$), ($b$) and ($c$), is a data structural view of encoded data.
Figure 6B:
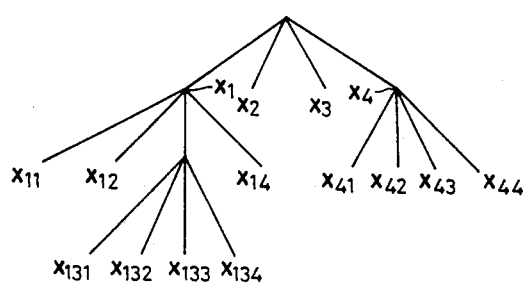
Figure 6C:
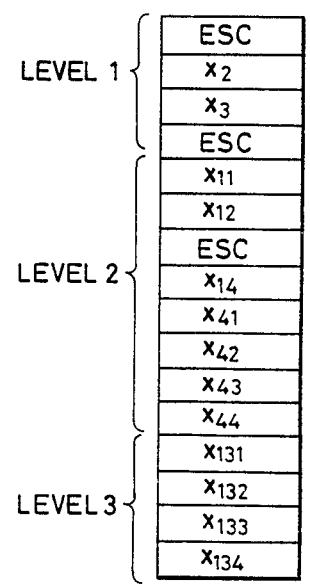

FIGS. 6(a), (b) and (c) are explanatory views each being useful for explaining the data structure. Hereinafter, the structure of the encoded data (for storage and communication) will be described. The data that are encoded as shown in FIG. 6(a) can be expressed by a quadtree such as shown in FIG. 6(b). This quadtree is stored by a data structure such as shown in FIG. 6(c). Each data is divided into four data blocks, each of which corresponds to one block on the image. The image blocks are sequentially stored from the upper order levels, and symbol ESC represents an escape mark (which represents that reduction to its level is not yet made and reference to a lower order level is further necessary). For example, in the first data block shown in FIG. 6(c), the block arrangement is (ESC $X_2$, $X_3$, ESC), and the first and fourth blocks of the first level require the reference to a lower order level while the second and third blocks can assume the brightness values of $X_2$ and $X_3$, respectively. The block in which the ESC mark is stored is developed to the lower level which is lower by one stage and the ESC mark is stored in the subsequent data block. Namely, in the case of the example shown in FIG. 6(c), the data corresponding to the first ESC is stored in the second data block while the data corresponding to the second ESC is stored in the third data block, respectively. After this data structure is generated, it is possible to make variable length encoding including the ESC marks (Huffman encoding).

Figure 8:
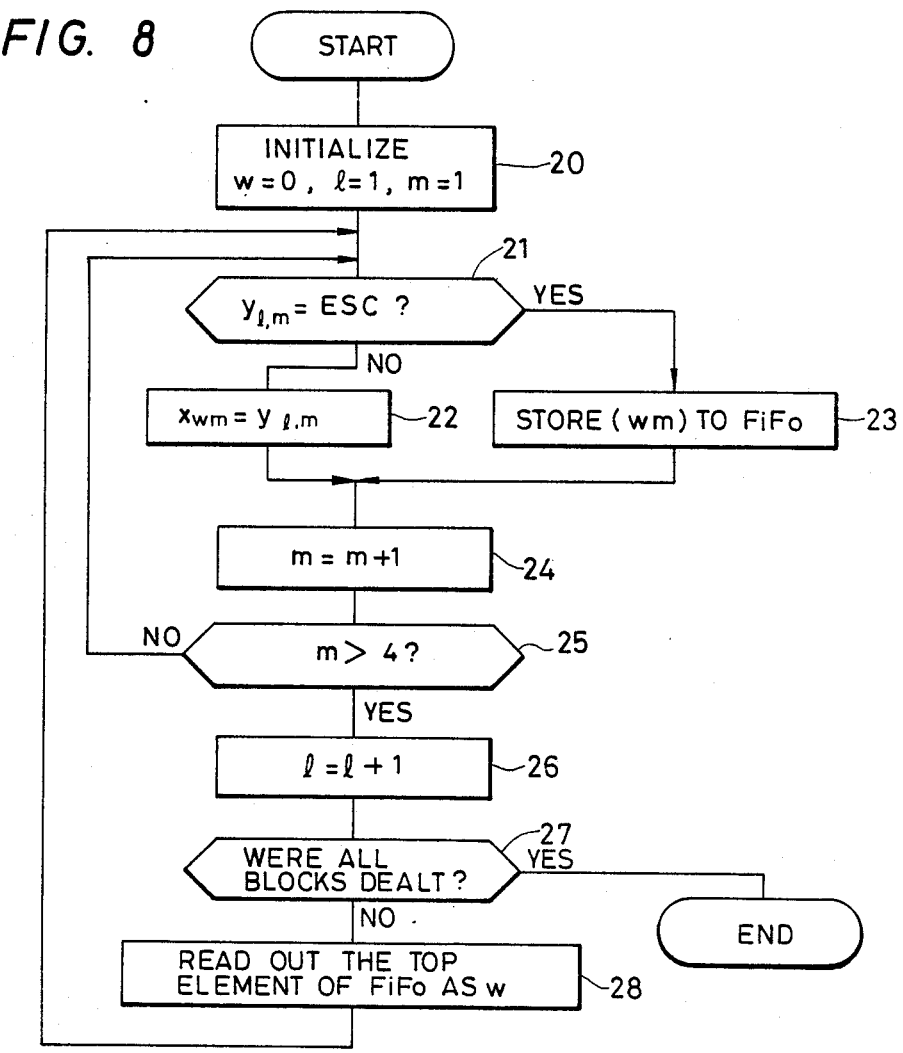
FIG. 8 is a flowchart of a decoding sequence in one embodiment of the present invention.

FIG. 2 is a block diagram of a data encoding/decoding apparatus to which the present invention is applied. When the invention is applied to a facsimile signal, for example, the apparatus consists of a line buffer 31, a counting/brightness generation circuit 32, a code/decode circuit 33 and a buffer 34. When encoding, the image read by a scanner is stored in the line buffer 31 line by line, the pixels are counted by the count/brightness generation circuit 32 and the encoding processing shown in FIG. 1 is then effected by the code/decode circuit 33. Then, the data in a form such as shown in FIG. 6(c) is stored in the buffer 34. When data transmission is made, the data is delivered to a transmission line after being modulated to a.c. signals through a MODEM. When a compression signal is received from the transmission line, the data received through the MODEM is stored in the buffer 34 in the sequence of transmission in the form shown in FIG. 6(c). The data is transferred from the buffer 34 to the queue of a FIFO and the later-appearing decoding processing shown in FIG. 8 is made in the code/decode circuit 33. After brightness is generated by the brightness generation circuit 32, the data is first stored in the line buffer 31 and is outputted as serial signals to the plotter for depicting the image.

(B) Decoding Method:

Next, the decoding method of the encoded data will be described. The data block number, the data number inside the block and the encoded data in FIG. 6(c) are expressed by l, m (m=1~4) and Yl, m respectively. The queue of the FIFO (First In First Out) is prepared as means for determining the lower order level development block from the ESC mark.

FIG. 7 is a view for explaining the FIFO operation, and FIG. 8 is a flowchart of the decoding processing in one embodiment of the present invention. The decoding sequence is as follows.

First of all, when l=1 (step 20), (a) if Yl, m≠ESC, $X_m = Yl, m$ (steps 21, 22), If Yl, m=ESC, m is stored in FIFO (step 23). Further, when l≧2 (step 26). The top element ω is read out from FIFO (step 28).

(b) If Yl, m≠ESC, $X_{\omega m} = Yl, m$ (steps 21, 22). If Yl, m 30=ESC, (ω, m) is stored in FIFO (step 23).

Here, ω is an integer sequence and (ω, m) is an integer sequence obtained by adding m to ω. This procedure is repeated until all the data block is complete, and when all the data blocks are dealt with, the procedure is complete (step 27).

Figure 7A:
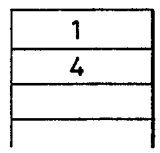
FIG. 7($a$), ($b$) and ($c$), is an operation diagram of FIFO.
Figure 7B:
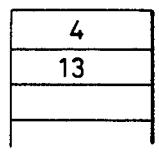
Figure 7C:
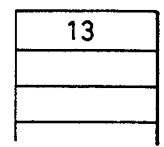

FIGS. 7(a), (b), (c) show the FIFO operation in the example shown in FIG. 6(c). To carry out the FIFO operation, the data is sequentially stored from the lower part to the upper part of the buffer, and the uppermost data is read out. In FIG. 7(a), the data is stored in the sequence of 1, 4 and in FIG. 7(b), the data is stored in the sequence of 4, 1 3 after the first 1 is read out. In FIG. 7(c), after 4 is read out, only 1 3 is shown stored.

In the manner described above, the brightness $Xi_1 \ldots i_k$ of each block can be reproduced from the data sequence of FIG. 5(c).

The coordinates (X, Y) of the pixels contained in the block ($i_1 \ldots i_k$) are determined by the following formula and decoding at the pixel level can be made:

$$2^n \sum_{j=1}^{k} (\tfrac{1}{2})^j p_j \leq X < 2^n \left( \sum_{j=1}^{k} (\tfrac{1}{2})^j p_j + (\tfrac{1}{2})^k \right) \quad (6)$$

$$2^n \sum_{j=1}^{k} (\tfrac{1}{2})^j q_j \leq Y < 2^n \left( \sum_{j=1}^{k} (\tfrac{1}{2})^j q_j + (\tfrac{1}{2})^k \right) \quad (7)$$

where: $p_j = \begin{cases} 0 \ (i_j = 1 \text{ or } 3) \\ 1 \ (i_j = 2 \text{ or } 4) \end{cases}$ $q_j = \begin{cases} 0 \ (i_j = 1 \text{ or } 2) \\ 1 \ (i_j = 3 \text{ or } 4) \end{cases}$ Next, the compression rate is evaluated on the basis of a simple model.

(A) Assumption:

(a) An image of 512×512×8 bit/pixel is assumed.

(b) Among the regions requiring the accuracy of at least the level i, the ratio of the regions not requiring the accuracy of at least the level (i+1) is set to be α, in conjunction with the given allowable distortion D and the object image.

(c) The compression component resulting from the variable length encoding is not taken into consideration. In other words, the data in the form shown in FIG. 5(c) is subjected to equal length encoding.

(B) Evaluation of Compression Ratio:

The assumed lowermost level is called "K". In other words, if K=9, 1×1 is the block of the lowermost level and if K=8, 2×2 is the block of the lowermost level. In this case, if encoding up to the ESC mark is made, the necessary bit number is given by the following formula:

$$B\alpha,k = \sum_{i=0}^{k-1} 4 \cdot 4^i (1-\alpha)^i \times 8 = 32 \times \frac{1 - 4^k(1-\alpha)^k}{1 - 4(1-\alpha)}$$

Accordingly, the compression ratio $C\alpha,k$ is given as follows:

$$C\alpha,k = \frac{B\alpha,k}{512 \times 512 \times 8} = \frac{1 - 4^k(1-\alpha)^k}{65536(1 - 4(1-\alpha))}$$

Figure 9:
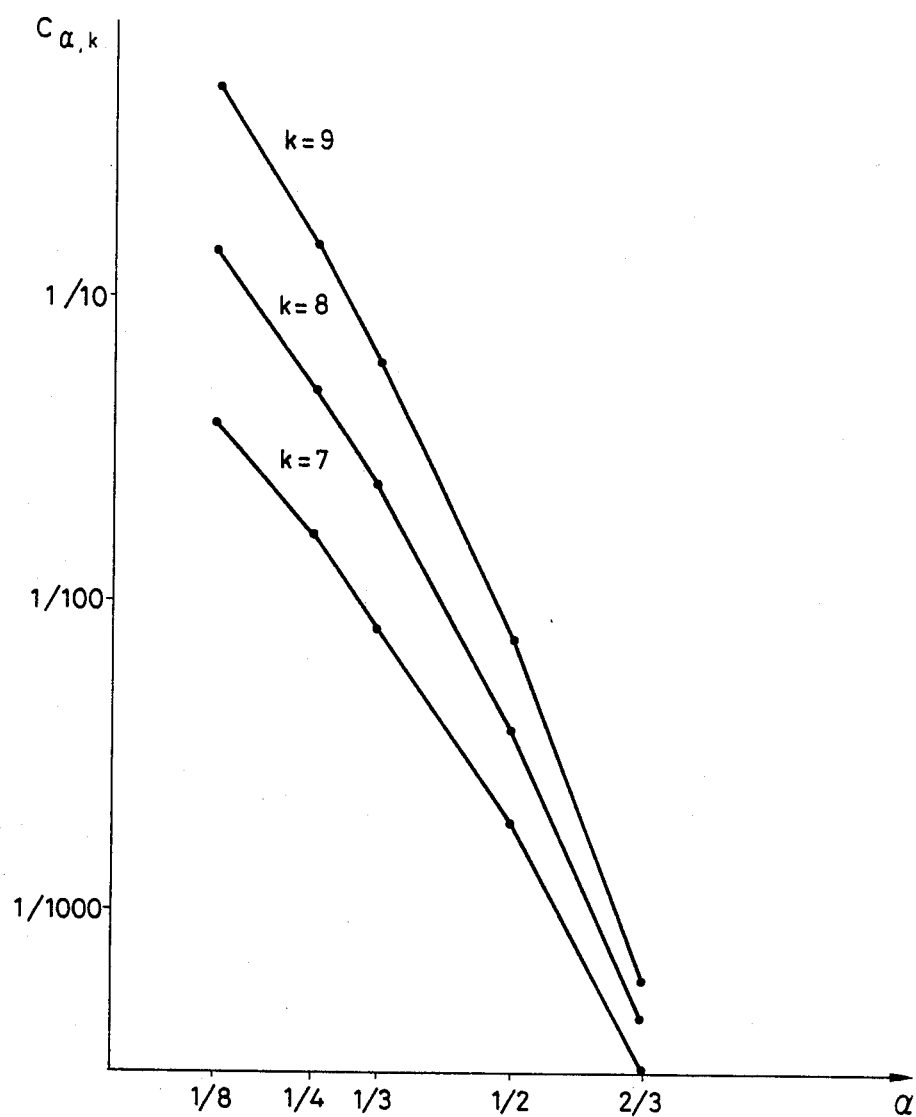
FIG. 9 is a graph showing the evaluation of a compression ratio.

FIG. 9 is a graph of the compression ratio evaluation, and shows the result of calculation of $C\alpha, k$ for some values of k and α. When $\alpha = \tfrac{1}{2}$, a compression ratio of 1/100 can be accomplished by improving spatial resolution to K=9 (pixel level) but when $\alpha = \tfrac{1}{4}$, spatial resolution must be lowered to about K=7 (4×4 block) in order to make compression of 1/100.

(C) Evaluation of S/N:

The S/N value is determined from the mean distortion:

$$S/N = 20 \log_{10} \frac{2^8}{\sqrt{M \cdot S \cdot E}}$$

Where M.S.E. is the mean distortion. Since M.S.E. does not exceed the allowable mean distortion, $$S/N \geq 20 \log_{10} \frac{2^8}{\sqrt{D}}$$

can be established. Whereas the conventional method can evaluate S/N only after encoding and decoding are effected, the present invention can evaluate in advance S/N using the allowable distortion D as the parameter and the method of invention is easier to practise.

Next, another embodiment of the present invention will be described with reference to FIGS. 10 to 15.

FIGS. 10(a), (b) are explanatory views useful for explaining the slope of brightness and an approximation method of brightness. Mean distortion is used as the reference of block division so that the mean distortion does not exceed the designated allowance value, as described already. As the index of distortion which is mostly used, there is a mean square difference as described with reference to FIG. 3 and this formula is given again below:

$$d = \frac{1}{N^2} \sum_{ij} (\overline{X}_{ij} - X_{ij})^2 \qquad (8)$$

where
d: mean distortion,
N: number of pixels in block,
$X_{ij}$: brightness of pixel (i, j),
$\overline{X}_{ij}$: encoded/decoded brightness of pixel (i, j).

A brightness slope approximate to the mean brightness inside each block is used to encode the block. The mean brightness is expressed by the following formula:

$$\overline{X} = \frac{1}{N^2} \sum_{ij} X_{ij} \qquad (9)$$

The brightness slopes Δ (in the i-axis direction) and δ (in the j-axis direction) are such as shown in FIG. 10(a) and are determined in the following way. First of all, $\overline{X}_{ij}$ of the formula (8) is expressed as follows by use of $\overline{X}$, Δ and δ:

$$\overline{X}_{ij} = \overline{X} + (2i - N - 1)\Delta + (2j - N - 1)\delta \qquad (10)$$

This means that the curved surface formed by the brightness inside the block is approximated by the flat surface of the slope (2Δ, 2δ) (see FIGS. 10(a), (b)). Approximation that minimizes distortion is derived from the condition which minimizes d obtained by putting the formula (10) into the formula (8). A definite calculation method of Δ and δ on the basis of this condition will be described in detail in the later-appearing embodiment.

The encoding method and the decoding method will be explained with reference to FIGS. 11 to 14 and FIGS. 15 and 16, respectively.

Figure 11:
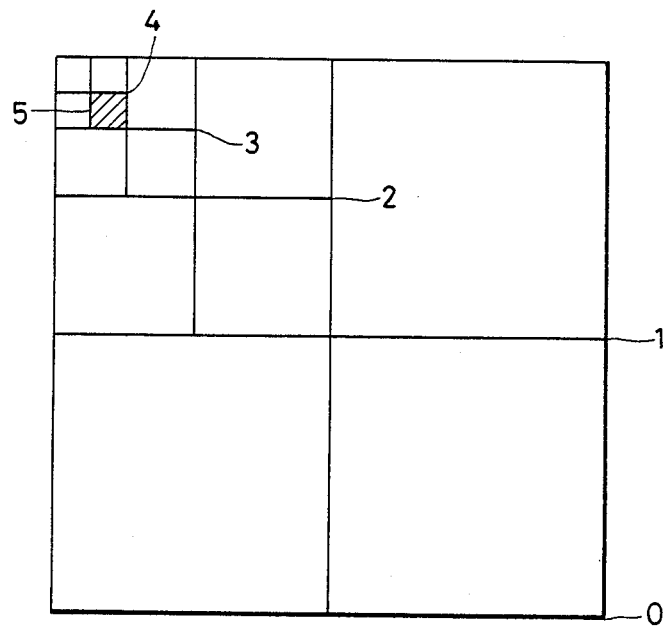
FIG. 11 is an explanatory view of a block hierarchy.

(A) Encoding Method:

FIG. 11 reproduces FIG. 4 and is used for explaining the expression method of a non-equal length block. Blocks having sizes of $1 \times 1, 2 \times 2, \ldots, 2^n \times 2^n$ are considered. The $1 \times 1$ block is a pixel itself and the $2^n \times 2^n$ block is the image as a whole. Here, the $2^n \times 2^n$ block is called "the uppermost order level (0th level)" while the $1 \times 1$ block is called "the lowermost order level (nth level)". In the case of the example shown in FIG. 11, 0 to 4 represent the blocks of the 0th to fourth levels, respectively. To express each block, since four blocks each having a size of $2^{n-1} \times 2^{n-1}$ exist in the first level, they are called "1, 2, 3 and 4", respectively, in the order to the upper left, upper right, lower left and lower right. Next, in the second level, sixteen $2^{n-2} \times 2^{n-2}$ blocks exist and four of these blocks correspond to one block of the first level. Therefore, the four blocks of the second level contained in the same block of the first level are called "1, 2, 3 and 4", respectively, in the same way as in the first level. In other words, the blocks of the second level are uniquely determined by the combination $(i_1, i_2)$ of the block number $i_1$ ($i_1 = 1 \sim 4$) of the first level and the block number $i_2$ ($i_2 = 1 \sim 4$) of the second level. In this manner, one block of a kth level can be expressed generally by $(i_1, i_2, \ldots, i_k)$. In the case of the example shown in FIG. 3, the block 5 (the hatched block) can be expressed as (1, 1, 1, 4).

The mean brightness and the approximate brightness slope of the block $(i_1, i_2, \ldots i_k)$ expressed by the method described above will be hereby called "$Xi_1 i_2 \ldots i_k$" and "$\Delta i_1 i_2 \ldots i_k, \delta i_1 i_2 \ldots i_k$", respectively Furthermore, the approximate value obtained by approximating the brightness of the pixels in the block in accordance with the formula (10) by use of $Xi_1 \ldots i_k, \Delta i_1 \ldots i_k, \delta i_1 \ldots i_k$ is expressed as $di_1 \ldots i_k$. In other words, $$Xi_1 \ldots i_k = \frac{1}{4^{n-k}} \sum_{i_{k+1} \ldots i_n} Zi_1 \ldots i_n \qquad (11)$$

$$di_1 \ldots i_k = \underset{\Delta \delta}{\text{Min}} \frac{1}{4^{n-k}} \sum_{i_{k+1} \ldots i_n} (\overline{X}i_1 \ldots i_n - Zi_i \ldots i_n)^2 \qquad (12)$$

where $Zi_1 \ldots i_n$ is the brightness of the pixel $(i_1 i_2 \ldots i_n)$. Incidentally, the suffix $i_1 \ldots i_n$ moves respectively within the range of from 1 to 4.

When starting from the lowermost order level and the mean distortion defined by the formula (12) does not exceed the given allowance value D, the four blocks are unified into one block of the order which is higher by one stage than their stage. In other words, when $$di_1 \ldots i_k \leq D \qquad (13)$$

Figure 12:
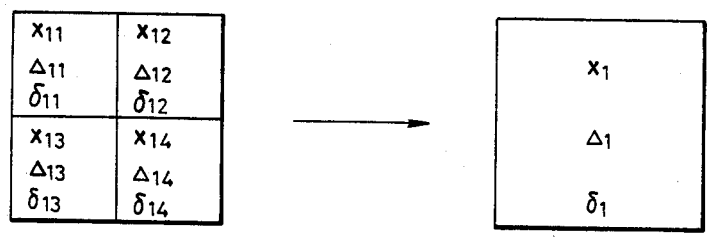
FIG. 12 is an explanatory view of reduction.

$Xi_1 \ldots i_{k1} \sim X_{i1} \ldots i_{k4}$ are represented by $Xi_1 \ldots i_k, \Delta i_1 \ldots i_{k1} \sim \Delta i_1 \ldots i_{k4}$ by $\Delta i_1 \ldots i_k$ and $\delta i_1 \ldots i_{k1} \sim \delta i_1 \ldots \delta i_1 \ldots i_{k4}$ by $\delta i_1 \ldots i_k$, respectively (see FIG. 12).

Next, a definite calculation method of X, Δ, δ and d to execute reduction will be described. From the formulas (11) and (12), the following relational formulas of X, Δ, δ and d can be derived:

$$Xi_1 \ldots i_k = \frac{1}{4} \sum_{i_{k+1}} Xi_1 \ldots i_k + 1 \qquad (14)$$

$$\Delta i_1 \ldots i_k = \frac{A_k + 1}{A_k} \sum_{i_{k+1}} \Delta i_1 \ldots i_k + 1 + \qquad (15)$$

$$\frac{2^{3(n-k-1)}}{A_k} \sum_{i_{k+1}} S_{ik} + 1 \, Xi_1 \ldots i_k + 1$$

$$\delta i_1 \ldots i_k = \frac{A_k + 1}{A_k} \sum_{i_{k+1}} \delta i_1 \ldots i_k + 1 + \qquad (16)$$

$$\frac{2^{3(n-k-1)}}{A_k} \sum_{i_{k+1}} t_{ik} + 1 \, Xi_1 \ldots i_k + 1$$

$$di_1 \ldots i_k = \frac{1}{4} \sum_{i_{k+1}} (d^2_{i1} \ldots i_k + 1 + X^2_{1i} \ldots i_k + 1) + \qquad (17)$$

$$\frac{A_k + 1}{4^{n-k}} \sum_{i_{k+1}} (\Delta^2 i_1 \ldots i_k + 1 + \delta^2 i_1 \ldots i_k + 1) -$$

$$X^2 i_1 \ldots i_k - \frac{A_k}{4^{n-k}} (\Delta^2 i_1 \ldots i_k + \delta^2 i_1 \ldots i_k)$$

Here, $S_i, t_i$ (i=1~4) and $A_k$ (k=1, ... n) are coefficients that take the following values:

$$S_1 = S_3 = -1, \quad S_2 = S_4 = 1,$$

$$t_1 = t_2 = -1, \quad t_3 = t_4 = 1,$$

$$A_k = \frac{1}{3} \cdot 4^{n-k} (4^{n-k} - 1) \qquad (18)$$

From the formulas (7) to (10), X, Δ, D and d can be calculated recurrently from X, Δ, δ and d of the level lower than by one stage, and calculation can be made efficiently from the practical aspect, too.

Figure 13:
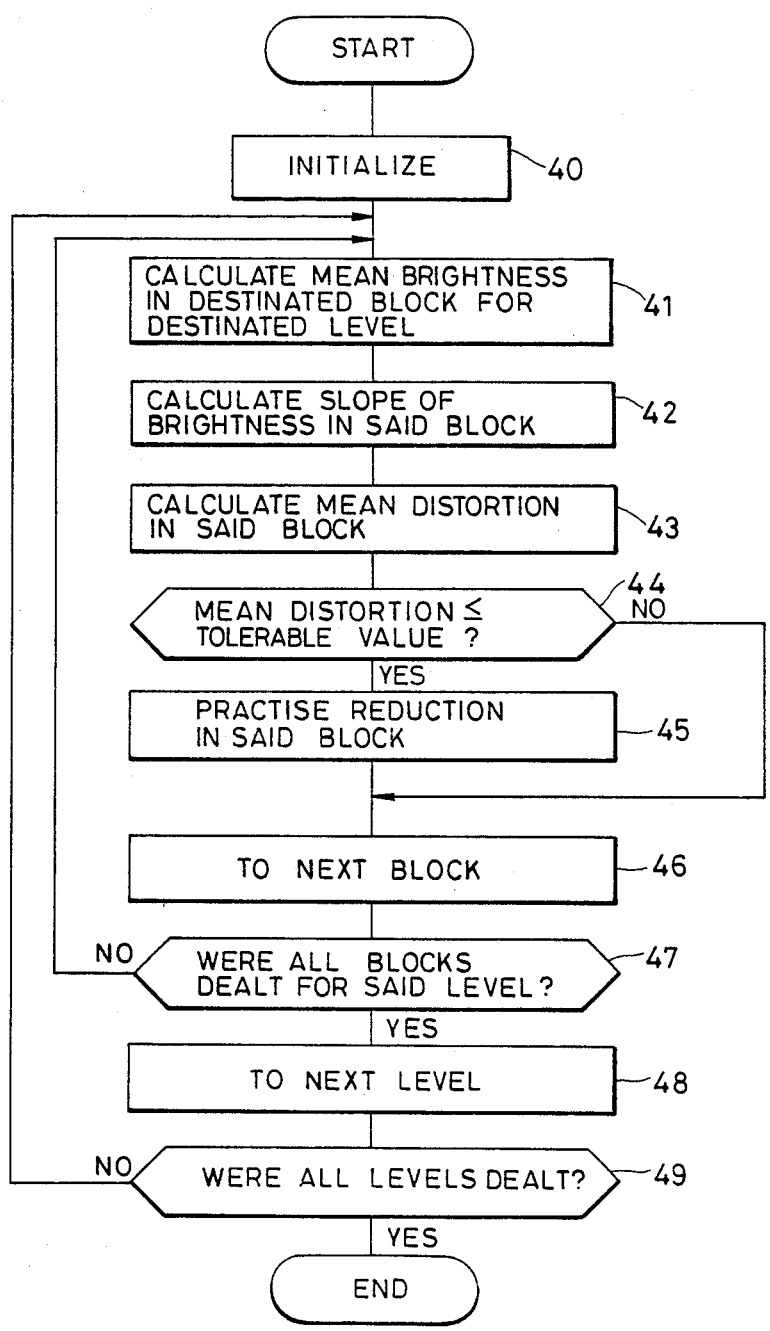
FIG. 13 is a flowchart of an encoding sequence of another embodiment of the present invention.
Figure 14:
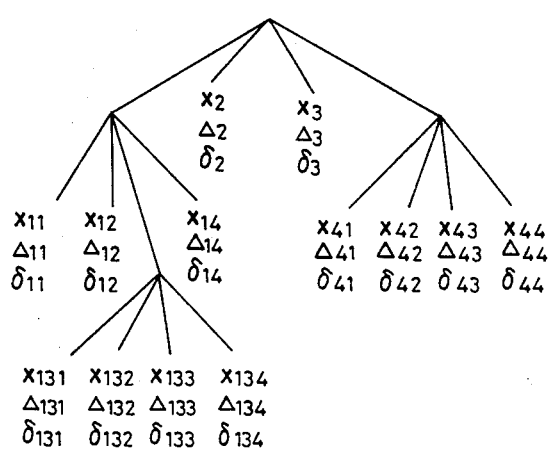
FIG. 14($a$), ($b$) and ($c$), is a data structural view of encoded data.

FIG. 13 is a flowchart of the encoding sequence in another embodiment of the present invention. First of all, the lowermost level and the top block are set at step 40. Mean brightness X is determined in accordance with the formula (14) at step 41, and the slopes of brightness $\Delta$, $\delta$ are calculated in accordance with the formulas (15) and (16) in step 42. Then, the mean distortion d is determined in accordance with the formula (17) at step 43. Judgement of the formula (13) is made at step 44, and if the formula (13) is satisfied, reduction is executed at step 45. Processing of the next block is made at step 46, but when the next block has already become impossible for reduction, the flow skips. Whether or not the processing of all the blocks of the level that is being processed is completed is judged at step 47, and if it is, processing proceeds to the next level at step 48. Step 49 judges whether or not the processing of all the levels is complete, and if it is, the encoding sequence is completed.

FIGS. 14(a), (b) and (c) are data structural views of the encoded data. As shown in FIG. 14(a), the encoded data can be expressed by the quadtree such as shown in FIG. 14(b), and is stored in the data structure such as shown in FIG. 14(c). The data is divided into four each data blocks, which correspond to one block on the image. The image blocks are sequentially stored from the upper order levels, and symbol ESC represents an escape mark (representing that reduction is not made to that level and reference to lower order levels is necessary). In the first data block of FIG. 14(c), for example, the data arrangement is (ESC, $(X_2, \Delta_2, \delta_2)$, $(X_3, \Delta_3, \delta_3)$, ESC). The first and fourth blocks of the first level need reference to the lower order level, while the second and third blocks are encoded to $(X_2, \Delta_2, \delta_2)$, $(X_3, \Delta_3, \delta_3)$, respectively. The block storing the ESC mark is further developed to the level which is lower by one stage, and is stored in the subsequent data block. Namely, in the example of FIG. 14(c), the data corresponding to the first ESC is stored in the second data block while the data corresponding to the second ESC is stored in the third data block. After such a data structure is generated, it is possible to make variable length encoding (Huffman encoding) including the ESC mark, if there is any deviation of the data values.

(B) Decoding Method:

Next, the decoding method of the encoded data will be described.

Here, the data block number in FIG. 14(c) is expressed by l, the data number inside the block by m (m=1~4) and the encoded data, by Yl, m, (set of X, $\Delta$, $\delta$), respectively. Here, the queue of FIFO is prepared as means for determining the development block of lower order levels from the ESC mark.

Figure 15:
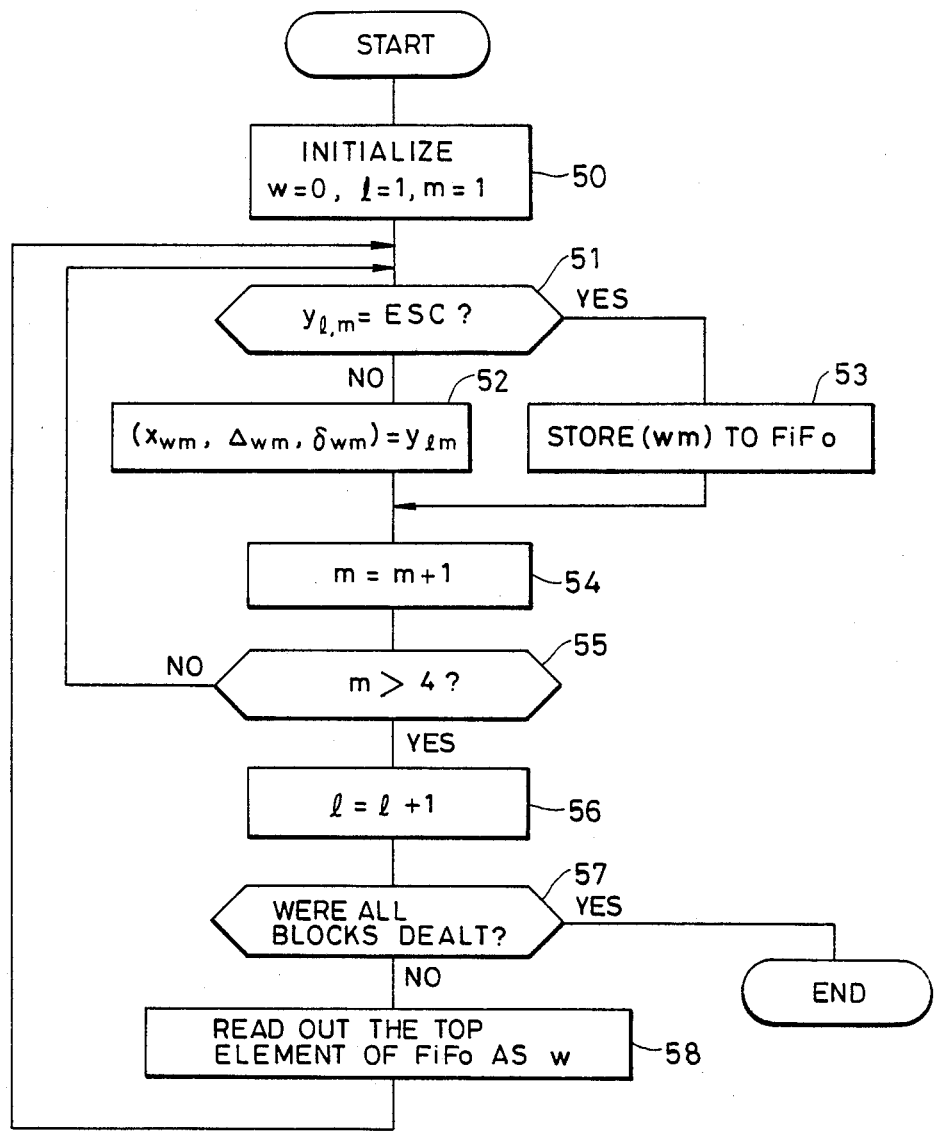
FIG. 15 is a flowchart of a decoding sequence of the data.

FIG. 15 is a decoding processing flowchart in another embodiment of the present invention.

First of all, if (a) Yl, m≠ESC when l=1, (X), $\Delta$m, $\delta$m)=Yl, m (steps 50, 51, 52).

If Yl, m=ESC, m is stored in FIFO (steps 51, 53).

Next when l≧2, (a) the top element $\omega$ is read out from FIFO (steps 56, 58). (b) when Yl, m≠ESC (X$\omega$m, $\Delta\omega$m, $\delta\omega$m)=Yl, m (steps 51, 52). If Yl, m=ESC, ($\omega$, m) is stored in FIFO (steps 51, 53).

Here $\omega$ represents an integer sequence and ($\omega$, m) does integer sequence obtained by adding m to $\omega$.

In this manner, the brightness $X_{i_1} \ldots i_k$ and the brightness slope $\Delta_{i1} \ldots i_k$, $\delta_{i1} \ldots i_k$ of each block can be reproduced from the data line shown in FIG. 14(c). Here, the coordinates of the pixels contained in this block are within the following range:

$$\sum_{j=1}^{k} 2^{n-j} pj < X \leq \sum_{j=1}^{k} (2^{n-j} pj + 2^{n-k}) \quad (19)$$

$$\sum_{j=1}^{k} 2^{n-j} qj < Y \leq \sum_{j=1}^{k} (2^{n-j} qj + 2^{n-k}) \quad (20)$$

where $P_j = \begin{cases} 0 & (ij = 1 \text{ or } 3) \\ 1 & (ij = 2 \text{ or } 4) \end{cases}$ $q_j = \begin{cases} 0 & (ij = 1 \text{ or } 2) \\ 1 & (ij = 3 \text{ or } 4) \end{cases}$ The following formula $X_{xy} = X_{i_1 \ldots ik}$ $+ (2X - \bar{X} - \underline{X} - 1)\Delta_{i_1 \ldots ik}$ $+ (2Y - \bar{Y} - \underline{Y} - 1)\delta_{i_1 \ldots ik} \quad (21)$ can be established by setting $\underline{X}$, $\bar{X}$, $\underline{Y}$ and $\bar{Y}$ as follows and applying the formula (10) to the brightness $X_{xy}$ of the pixel (X, Y):

$$\underline{X} = \sum_{j=1}^{k} 2^{n-j} pj, \quad \bar{X} = \sum_{j=1}^{k} (2^{n-j} pj + 2^{n-k}),$$

$$\underline{Y} = \sum_{j=1}^{k} 2^{n-j} qj, \quad \bar{Y} = \sum_{j=1}^{k} (2^{n-j} qj + 2^{n-k}).$$

Accordingly, decoding in the pixel level becomes possible.

In accordance with this embodiment, since the inside of the block is enclosed by use of the brightness slopes, the portions whose brightness slope is near constant can be compressed as one block. The compression ratio is determined by the allowable mean distortion D and the characteristics of the object image, but the compression ratio is evaluated on the basis of a simple model as described below.

(A) Assumption:

(a) An image of 512×512×8 bit/pixel is assumed.

(b) Among the regions requiring the accuracy of at least the level i, the ratio of the regions not requiring the accuracy of at least the level (i+1) is set to be $\alpha$, in conjunction with the given allowable distortion D and the object image.

(c) The compression component resulting from variable length encoding is not taken into consideration. In other words, the data in the form shown in FIG. 14(c) is subjected to equal length encoding.

(B) Evaluation of Compression Ratio:

The lowermost level assumed is K. In other words, if K=9, 1×1 is assumed to be the lowermost level block and if K=8, 2×2 is assumed to be the lowermost level block. In this case, if encoding is made inclusive of the ESC mark, the necessary bit number is given by the following formula:

$$B_{\alpha,k} = \sum_{i=0}^{k-1} 4 \times 4^i (1-\alpha)^i \times 8 \times 3$$

$$= 96 \times \frac{1 - 4^k(1-\alpha)^k}{1 - 4(1-\alpha)}$$

Therefore, the compression ratio $C_{\alpha,k}$ is given as follows:

$$C_{\alpha,k} = \frac{B_{\alpha,k}}{512 \times 512 \times 8} = \frac{3(1 - 4^k (1 - \alpha)^k)}{65536(1 - 4(1 - \alpha))}$$

FIG. 9 shows the results of calculation of $C_{\alpha,k}$ for some K, $\alpha$ values. Incidentally, the evaluation of S/N is the same as already described.

As described above, the present invention produce a encoding while utilizing not only the local redundancy of the image but also its global redundancy, and can therefore make high data compression. Furthermore, since the inside of the block is encoded by use of the brightness slope, the portions having the brightness slope which is nearly constant can be compressed as one block.

What is claimed is:

1. A method of encoding image data, comprising the steps of:
    dividing said image data into blocks of variable size so that an index representing the degree of an error, generated by approximation of the data in each block by a polynomial function of at least two independent variables corresponding to the coordinates on said image data multiplied respectively by a predetermined coefficient, is less than a predetermined value;
    quantizing the coefficient of said function;
    encoding said quantized data in a form of treestructured data.

2. A method of encoding image data according to claim 1, wherein said index is a mean square error of the data representing brightness of a pixel in each block.

3. A method of encoding image data according to claim 1, wherein said function is a linear function of two independent variables multiplied respectively by a predetermined coefficient.

* * * * *